Nov. 26, 1957

E. L. TURNER ET AL 2,814,451

CONVERTIBLE AIRCRAFT

Filed Nov. 23, 1955

INVENTORS

EUGENE L. TURNER and JOHN R. O'DWYER
BY: Beau, Brooks, Buckley & Beau,
ATTORNEYS.

Nov. 26, 1957  E. L. TURNER ET AL  2,814,451
CONVERTIBLE AIRCRAFT
Filed Nov. 23, 1955  2 Sheets-Sheet 2

INVENTORS
EUGENE L. TURNER
and JOHN R. O'DWYER
BY
Beau, Brooks, Buckley + Beau,
ATTORNEYS.

United States Patent Office 2,814,451
Patented Nov. 26, 1957

2,814,451
CONVERTIBLE AIRCRAFT

Eugene L. Turner, Fort Worth, and John R. O'Dwyer, Arlington, Tex., assignors to Bell Aircraft Corporation, Wheatfield, N. Y.

Application November 23, 1955, Serial No. 548,646

8 Claims. (Cl. 244—7)

The present invention relates to aircraft, and more particularly to improvements in "convertiplane" type aircraft having the advantages, when in forward flight, of fixed wing type aircraft, and the taking off and landing advantages of rotating-wing type aircraft.

It is now well known that aircraft having rotating wings may take off and be landed vertically without stalling and at slow speeds, but that such aircraft are, however, much slower in horizontal flight than the fixed wing type of craft. In fixed wing type aircraft it is necessary to provide wings of larger area than are necessary for sustaining the aircraft during level flight at normal or high speeds, in order to permit landings and take-offs of the aircraft at reasonable ground speeds. If level flight at normal cruising or higher speeds were to determine the wing loading factor it would be possible to employ a wing surface area only fractional of those required in conventional fixed wing aircraft, since the loading of the wing could correspond to that of least resistance at maximum flying speed. With such a reduction in the wing surface area and the consequent reduction in size of the remainder of the aircraft structure, greater maximum speeds could be obtained. However, for the reasons stated a compromise between the requirements of slow landing and take-off speeds and of maximum flying speed must be involved in fixed wing aircraft designs.

The present invention relates to an aircraft having a fixed aerofoil surface or surfaces to support the craft in horizontal flight at maximum speed, and one or more rotors balanced relative to the fore-and-aft plane of symmetry of the craft and mounted for bodily adjustment between vertical and horizontal attitudes relative to the airframe while the latter remains in horizontal attitude. The aircraft engine is arranged to drive the rotors at any adjusted attitudes thereof, and in the case of the present invention the aircraft rotor and drive system also includes means operable upon failure of the engine and/or the normal control system of the aircraft to effect an adjustment of the attitudes of the rotors to the vertical. At the same time a "free-wheeling" disconnection of the rotors relative to the power plane and drive system is effected whereby the rotors are then operable in accord with the well known "auto-rotation" technique to lower the aircraft gently to the ground.

Thus, it is an object of the invention to provide in an aircraft of the character aforesaid an improved rotor attitude and operation control system; whereby the pilot may, under emergency or other stress conditions, have a control facility readily available for instantaneous actuation such as will set into effect a series of adjustments of the rotor attitudes and of the rotor operating control organization, to convert the flight operation from one of forward flight into vertical descent at a speed slow enough for safe landing, even though no power is available from the engine or the electrical system, such as under engine or circuit failure conditions.

Another object of the invention is to provide an improved flight character conversion control system as aforesaid which is operable to permit the aircraft to settle to a safe landing under emergency conditions, such as in the presence of failures of the engine or rotor driving system or the electrical system, or the like.

Other objects and advantages of the invention will appear from the specification hereinafter.

Figure 1:
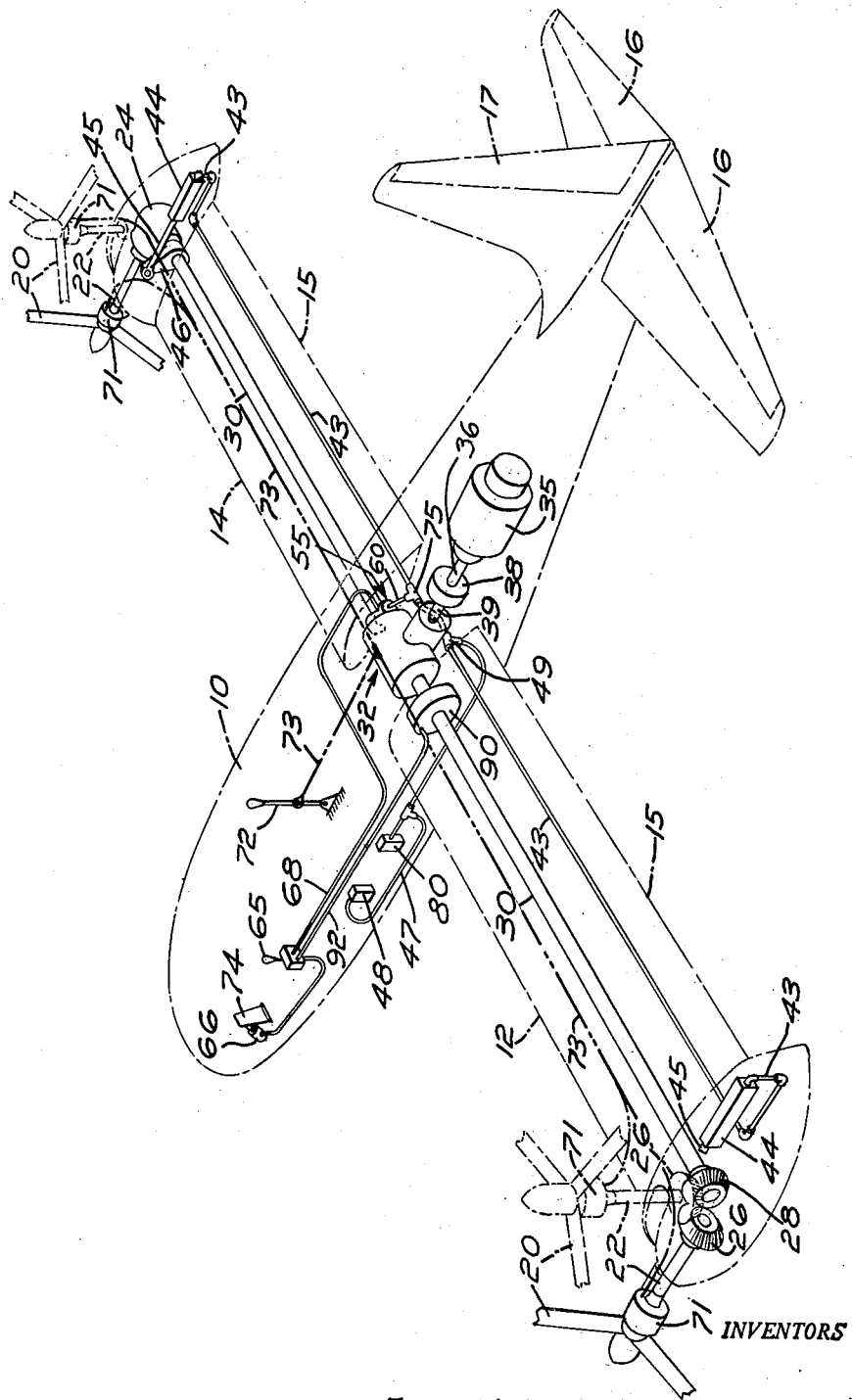
Fig. 1 is a schematic top perspective view of an aircraft embodying a rotor and rotor drive and rotor attitude control arrangement of the invention.
Figure 3:
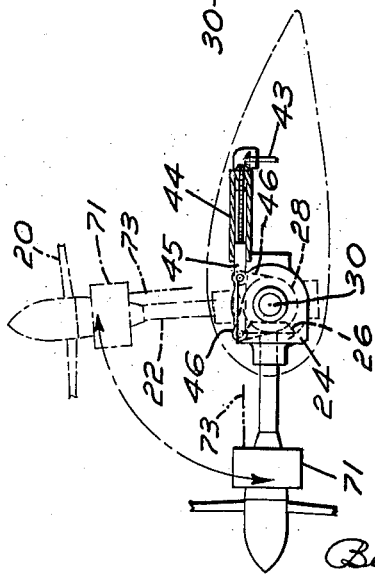
Fig. 3 is a fragmentary, combination elevational and sectional view of another component of the rotor attitude control and drive mechanism.

As illustrated in Fig. 1, an aircraft of the invention may comprise a suitably streamlined fuselage 10 having wing panels 12—14 extending from the opposite sides thereof and a suitable empennage component; including the usual aileron and flap surfaces for flight stabilization and roll and yaw and pitch control of the aircraft when in conventional forward flight, as indicated at 15, 16, 17. The wings 12—14 are preferably sectionally contoured and dimensioned so as to provide only sufficient lift to support the aircraft during horizontal flight at normal cruising or higher speeds, for flight efficiency purposes when operating in horizontal flight. A rotor 20 is mounted at each wing tip and is carried by a drive shaft 22 journaled in a housing 24 which is mounted upon the stationary wing frame structure so as to be rotatable about a horizontal axis extending spanwise of the wing panel. At their inner ends the drive shafts 22—22 are fitted with bevel gears or the like as indicated at 26 (Figs. 1, 3) which mesh with complementary bevel gears 28 keyed to corresponding cross shafts 30—30 which are journaled upon and extend interiorly of the wing panels in spanwise direction thereof into driving connections with a centrally positioned power transmission unit indicated generally at 32. As illustrated in Fig. 1, the aircraft engine may be located as indicated at 35 and coupled by means of a drive shaft 36 and clutch 38 to the transmission unit 32.

Figure 2:
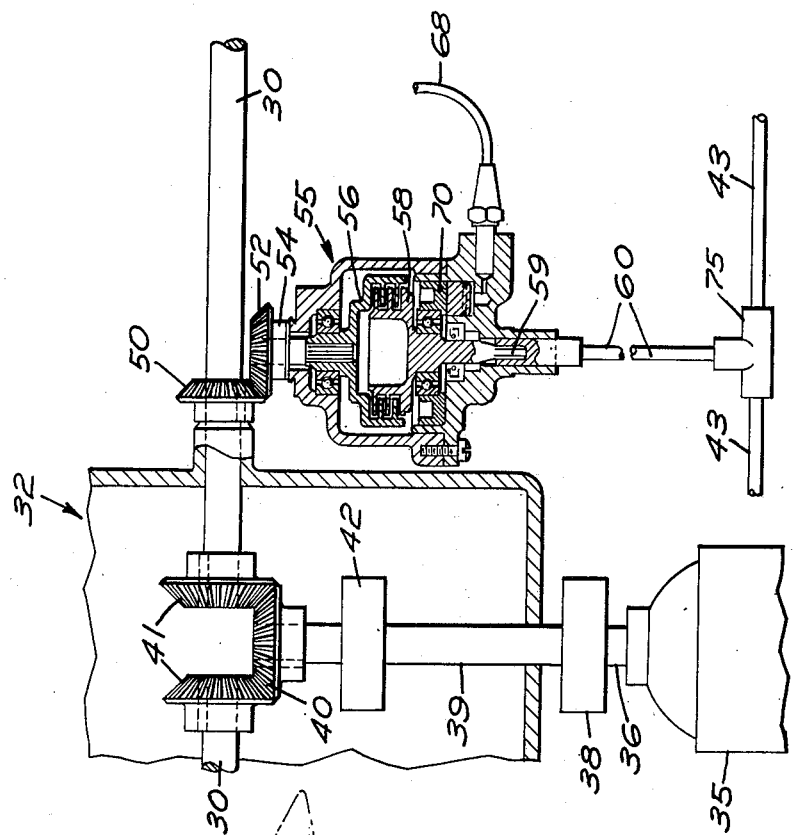
Fig. 2 is a fragmentary horizontal sectional view of a portion of the rotor drive and attitude control mechanism.

As illustrated in more detail in Fig. 2, the power transmission unit may typically comprise a drive shaft 39 carrying a bevel gear 40 meshed with gears 41—41 which are keyed to the inner ends of the shafts 30—30. As indicated at 42 (Fig. 2) a "free-wheeling" gear device may be mounted, for example, in conjunction with the drive shaft 39; the gear unit 42 being so arranged that it normally transmits power from the engine 35 to the rotors 20—20. However, in event of engine failure or other sudden stoppage of the engine 35, under such conditions that the rotors tend to rotate and drive the shafts 30—30 to overrun the shaft 39, the gear device 42 will permit such overrunning or "free wheeling" operation of the rotors.

To control the attitudes of the rotors 20—20 for the purpose of converting the airplane flight between horizontal and vertical flying maneuvers, a flexible cable or other suitable torque transmitting device as indicated at 43 is provided to extend interiorly of the wing panels in spanwise directions thereof and to connect at its opposite outer ends into screw jack devices as indicated at 44—44 mounted at the opposite wing tips. The jacks 44—44 operate corresponding push-pull struts 45—45 which in turn connect with horn devices 46—46 extending from the housings 24—24 previously referred to. A power supply device such as a cable 47 (Fig. 1) may be coupled at one end to a pilot-controlled power supply device 48, and at its other end as indicated at 49 to the flexible cable 43 for driving the latter in response to transmission of torque impulses through the cable 47 from the unit 48.

Thus, it will be appreciated that, for converting the aircraft flight between horizontal and vertical flight maneuvers under normal conditions, the pilot will simply operate the unit 48 so as to cause the rotors 20—20 to swing into either their horizontally or their vertically directed attitudes, as the intended flight maneuver may require. Thus, for example, for vertical take-off purposes, the engine 35 may first be started with the clutch 38 disengaged. The control device 48 may then be operated so as to cause the rotors 20—20 to swing into upright or vertically directed attitudes, whereby upon engagement of the clutch 38 the engine power will then be directed into the rotors 20—20 so as to cause the latter to rotate and lift the aircraft vertically off the ground. Then, upon attainment of the desired altitude, the pilot may manipulate the control 48 so as to gradually swing the rotors 20—20 forwardly into their horizontally directed attitudes, whereupon the aircraft will pick up forward speed and ultimately attain a conventional airplane horizontal flight condition.

Then, preliminary to vertically landing the aircraft, the pilot reversely operates the control 48 so as to cause the rotors 20—20 to again swing upwardly into their vertically directed attitudes, whereupon the aircraft will assume a hovering condition from which it may be permitted to settle slowly to the ground, as in the manner of conventional helicopter landing procedure. It will of course be appreciated that throughout the maneuvers hereinabove described the engine speed and rotor blade pitch controls will be pilot-adjusted in appropriate manner so as to coordinate the various flight control factors, as will be readily understood by anyone versed in the art.

The present invention, however, contemplates an additional means for powering the flexible shaft 43 to cause the rotors 20—20 to tilt from their forwardly or horizontally directed attitudes into their vertically directed attitudes under emergency conditions; such as when the aircraft engine and/or the electrical and/or the hydraulic power supply systems of the aircraft are inoperative. For this purpose one of the shaft portions 30 may be arranged to carry a bevel gear 50 (Fig. 2) which meshes with a corresponding gear 52 keyed to the drive shaft 54 of a clutch housing 56; the other portion of the clutch device being illustrated at 58 as having frictional clutch surfaces interleaved with the clutch surfaces of the portion 56 and keyed to a drive shaft 59 arranged in spline-keyed relation with a flexible drive shaft 60. Thus, when the clutch components 56—58 are interengaged, it will be apparent that rotation of the shaft 30 will cause the flexible shaft 60 to rotate.

Whereas, normally the clutch device 55 is in disengaged condition, a pilot-operable emergency flight conversion control device in the form, for example, of a hydraulic pressure control switch lever may be provided as indicated at 65 (Fig. 1) to control flow of fluid under pressure from the prime hydraulic system of the craft, or from any other suitable source such as a "stand by" hydraulic pump as indicated at 66. In any case the lever 65 controls flow through a conduit 68 into the clutch device 55 and beneath a piston device therein as indicated at 70 (Fig. 2).

Thus, it will be appreciated that under engine failure conditions, if the power supply to the control device 48 remains operative, the pilot may upon suitable adjustment thereof cause the rotors 20—20 to swing into their upwardly or vertically directed attitudes while they are freed from the "dead" engine as provided for by automatic release of the free wheeling unit 42. Then, upon appropriate manipulations of the collective pitch control mechanisms of the rotors 20—20, such as are indicated at 71—71, by adjustments of the rotor blade "collective" pitch control device as indicated at 72, operating through any suitable mechanical, hydraulic, or electrical connections 73, the aircraft may be pilot-controlled so as to settle relatively gently to the ground so as to effect a landing without disastrous results, as is well known in the helicopter art and as explained for example in U. S. Patents Nos. 2,368,698 and 2,384,516. On the other hand, if the power supply to the control device 48 is at the same time incapacitated, then the pilot may turn the hydraulic control lever 65 to the right so as to cause hydraulic pressure to be transmitted to the conduit 68 from either the prime hydraulic system of the aircraft or from the auxiliary pump as indicated at 66 in response to operation of the pedal 74 (Fig. 1). The hydraulic pressure so transmitted to the conduit 68 enters the clutch device 55 so as to cause the clutch elements thereof to interengage.

Assuming the aircraft to be involved in a horizontal forward flight maneuver at the time of the emergency control operation just referred to, the slip-stream reaction against the rotors 20—20 will cause the latter to drive the cross shafts 30—30 to rotate in "free wheeling" relation to the engine; thereby transmitting the torque of the "wind-milling" rotors through the clutch device 55 into the flexible shaft 60.

As indicated at 75, the cable 60 connects through means of a bevel gear driving connection to the cross cable 43 which trains spanwise in opposite directions through the wing panels 14—12 toward the tip ends thereof and terminates in driving connections with the screw jacks 44 as previously explained. Thus, in event of an engine failure or other similar emergency, whereupon the rotor drive shafts 30—30 tend to overrun the engine drive shaft, the pilot may simply throw the lever 65 to the right as explained hereinabove whereupon transmission of hydraulic pressure through the conduit 68 will then cause the clutch device 55 to engage and derive power from the "wind milling" rotors 20—20 and to transmit such power through the shaft devices 60—43 into the jack devices 44—44 at the wing tips. The application of this power to the jacks 44—44 is so directed and applied as to cause the latter to retract the struts 45—45 thereby drawing the rotor support brackets 24—24 to rotate in such manner as to pull the rotor devices 20—20 into their upright or vertically directed attitudes as shown in broken lines in Figs. 1–3. The pilot thereupon adjusts the "collective" pitch system of the rotor controls so as to cause the rotors 20—20 to go into "autorotation" operation, whereby the aircraft will settle toward the ground and may be landed at a safe landing speed without applications of engine power to the rotors.

A further safety device may be provided if desired to take care of the possibility that no power may be available at the device 48 referred to hereinabove, under emergency conditions. For example, a hand crank device as indicated at 80 may be connected to the torque transmitter 47, whereby upon complete power failure conditions the crew may hand crank the device 80 to cause the jacks 44—44 to swing the rotors into upright attitudes for conversion of the aircraft flight into a vertically settling autorotation maneuver, as explained hereinabove.

A rotor brake device is preferably provided in conjunction with the cross shafts 30—30, as indicated for example 90 (Fig. 1), and may be conveniently arranged to be actuated in response to applications of hydraulic fluid pressures thereon as through a conduit 92 controlled by manipulation of the emergency lever 65, for example, toward the left and away from its normal or centralized neutral position.

Although only one form of the invention has been shown and described in detail, it will be apparent to those skilled in the art that the invention is not so limited but that various changes may be made therein without departing from the spirit of the invention or the scope of the appended claims.

What is claimed is:

1. In a convertible aircraft having a rotor tiltable on said aircraft between horizontally and vertically directed attitudes, a power plant, power transmission means normally interconnecting said power plant and said rotor for driving the latter, a free wheeling clutch device embodied in said power transmission means, a supplementary transmission system, mechanism for tilting said rotor between horizontally and vertically directed attitudes, a clutch mechanism included in said supplementary power transmission system and pilot-operable to interengage said power transmission means and said rotor tilting mechanism whereby the torque power generated by said rotor in response to slip-stream reaction forces thereon during "wind milling" operation of said rotor may be utilized to power said tilting mechanism for tilting said rotor from horizontally to vertically directed attitude while the driving connection between said rotor and said power plant is inoperative, whereby under engine failure conditions said aircraft may be converted into a rotary wing type aircraft to settle gently to the ground in autorotation operation.

2. In a convertible aircraft having a wing and a pair of rotors at the wing tips, each rotor being tiltable on said aircraft between horizontally and vertically directed attitudes, a power plant, power transmission means normally interconnecting said power plant and said rotors for driving the latter, a free wheeling clutch device embodied in said power transmission means, means for tilting said rotors between horizontally and vertically directed attitudes, a clutch mechanism pilot-operable to interengage said power transmission means and said rotor tilting means whereby torque power generated by said rotors in response to slip-stream reaction forces thereon during "wind milling" operation of said rotors may be utilized to power said tilting means for tilting said rotors from horizontally to vertically directed attitudes while the driving connection between said rotors and said power plant is free wheeling, whereby under engine failure conditions said aircraft may be converted into a rotary wing type aircraft.

3. In a convertible aircraft having a fixed wing and a pair of rotors at the wing tips of said aircraft tiltable between horizontally and vertically directed attitudes, a power plant, power transmission means normally interconnecting said power plant and said rotors for driving the latter, mechanism for tilting said rotors between horizontally and vertically directed attitudes, and means including a clutch mechanism pilot-operable to connect said rotors in driving engagement with said rotor tilting mechanism for actuating the latter in response to torque power generated by said rotors in response to slip-stream reaction forces thereon in event of power plant stoppage while the aircraft is in forward flight with the rotors in horizontally directed attitudes, whereby "wind milling" operations of said rotors can be utilized to power the tilting of said rotors from horizontally to vertically directed attitudes while said power plant is inoperative.

4. In a convertible aircraft having a fixed wing and a pair of rotors at the wing tips of said aircraft tiltable between substantially horizontal and vertical attitudes, a power plant, power transmission means normally interconnecting said power plant and said rotors for driving the latter, a free wheeling clutch device embodied in said power transmission means, means for tilting said rotors between horizontally and vertically directed attitudes, and means including a clutch mechanism pilot-operable to interconnect said rotors and said rotor tilting means for actuating the latter in response to applications thereon of power generated by said rotors when "wind milling," whereby under engine failure conditions said aircraft may be converted into a rotary wing type aircraft in autorotative operation.

5. In a convertible aircraft having a fixed wing and a rotor tiltable between substantially horizontal and vertical attitudes while the aircraft remains in horizontal attitude, a power plant, power transmission means normally interconnecting said power plant and said rotor for driving the latter, a free wheeling clutch device embodied in said power transmission means, mechanism for tilting said rotor between horizontal and vertical attitudes, pilot-controlled power means for actuating said mechanism for tilting said rotor between horizontally and vertically directed attitudes under normal operating conditions, and means for actuating said mechanism for tilting said rotor from horizontal into vertical attitude in response to power generated by said rotor when "wind milling," whereby upon failure of said pilot-controlled power means said aircraft may be converted into a rotary wing type aircraft in autorotative operation.

6. In a convertible aircraft having a fixed wing and a pair of rotors at opposite sides of said aircraft tiltable between horizontally and vertically directed attitudes, a power plant, power transmission means including drive shafts for said rotors normally interconnecting said power plant and said rotors for driving the latter, first rotor tilt means deriving power from said aircraft power plant and pilot-controllable for tilting said rotors between horizontally and vertically directed attitudes, mechanism for tilting said rotors between horizontally and vertically directed attitudes, and second rotor tilt means pilot-operable to interengage said drive shafts of said rotors and said rotor tilting mechanism for actuating the latter in response to applications of torque power thereon generated by said rotors in response to slip-stream reaction forces thereon in event of power plant stoppage while the aircraft is in forward flight with the rotors in horizontally directed attitudes, whereby "wind milling" forces of said rotors may be utilized to power the tilting of said rotors from horizontally to vertically directed attitudes while said power plant is inoperative.

7. In a convertible aircraft having a wing and a rotor tiltable on said aircraft between horizontally and vertically directed attitudes, a power plant, power transmission means including a rotor drive shaft normally interconnecting said power plant and said rotor for driving the latter, a free wheeling clutch device embodied in said power transmission means, a mechanism for tilting said rotor, means deriving power from said power plant for actuating said mechanism for tilting said rotor between horizontally and vertically directed attitudes under normal conditions, and a clutch mechanism pilot-operable to interengage said rotor drive shaft and said rotor tilting mechanism whereby torque power generated by said rotor in response to slip-stream reaction forces thereon during "wind milling" operation of said rotor may be utilized to power the tilting of said rotor from horizontally to vertically directed attitude while the driving connection between said rotor and said power plant is "free wheeling," whereby under power plant failure conditions said aircraft may be converted into a rotary wing type aircraft.

8. In a convertible aircraft having a rotor tiltable on said aircraft between horizontally and vertically directed attitudes, a power system for said aircraft, power transmission means normally interconnecting said power system and said rotor for driving the latter, a free wheeling clutch device embodied in said power transmission means, a rotor tilting mechanism, means deriving power from said power system for tilting said rotor between horizontally and vertically directed attitudes, a clutch mechanism pilot-operable to drivingly connect said rotor to said rotor tilting mechanism whereby the torque power generated by said rotor in response to slip-stream reaction forces thereon during "wind milling" of said rotor may be utilized to power the tilting of said rotor from horizontally to vertically directed attitude while said free wheeling clutch device is released, whereby under power system failure conditions said aircraft may be converted from a fixed wing type aircraft into a rotary wing type aircraft to settle groundwardly in autorotation operation.

References Cited in the file of this patent

UNITED STATES PATENTS

| | | |
|---|---|---|
| 2,702,168 | Platt | Feb. 15, 1955 |
| 2,708,081 | Dobson | May 10, 1955 |